Sept. 11, 1951     A. F. SPILHAUS     2,567,246
CALCULATOR
Filed Feb. 5, 1946     2 Sheets-Sheet 1
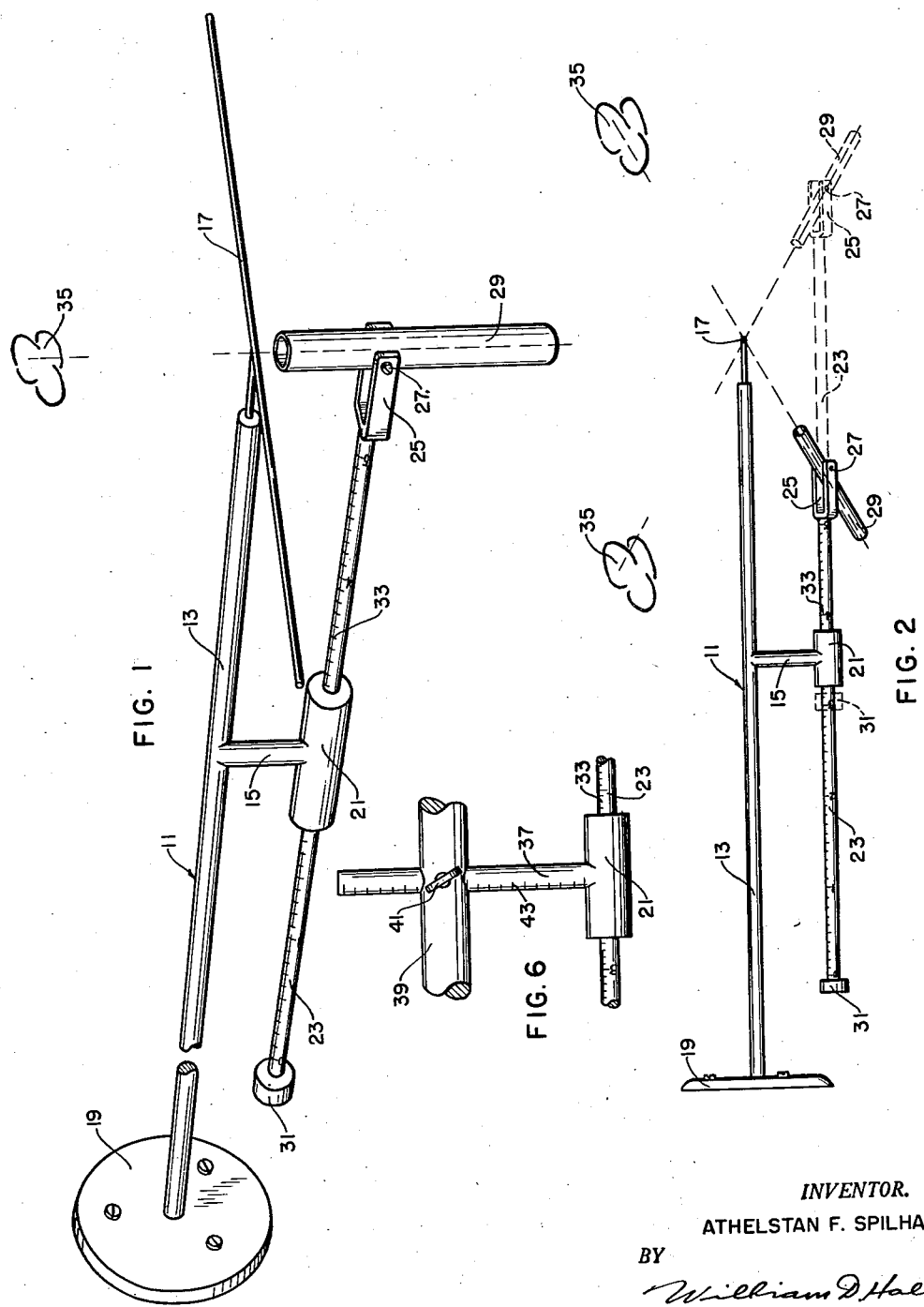
INVENTOR.
ATHELSTAN F. SPILHAUS
BY
*William D Hall.*
ATTORNEY Sept. 11, 1951     A. F. SPILHAUS     2,567,246
CALCULATOR
Filed Feb. 5, 1946     2 Sheets-Sheet 2
FIG. 3
FIG. 4
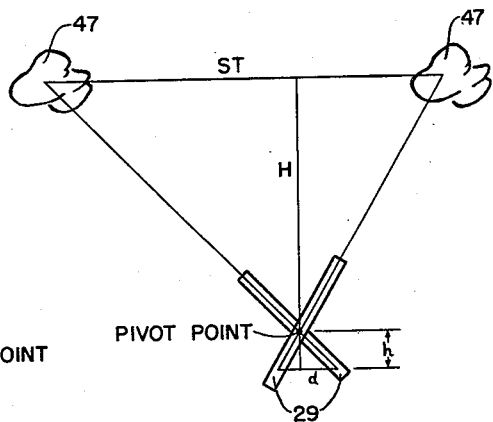
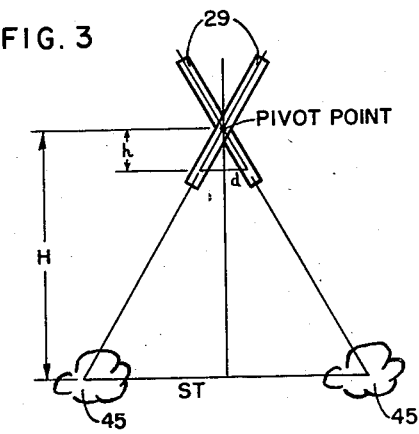
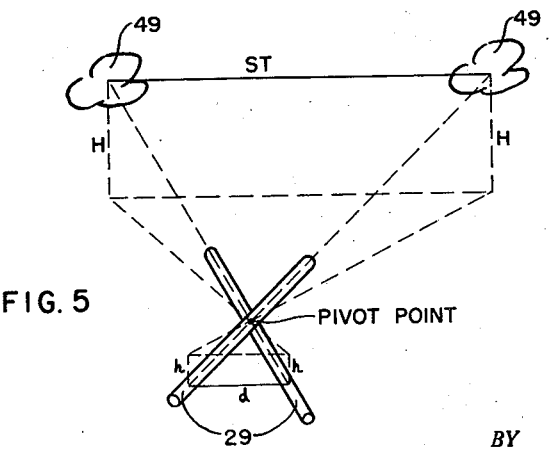
FIG. 5
INVENTOR.
ATHELSTAN F. SPILHAUS
BY
William D. Hall.
ATTORNEY Patented Sept. 11, 1951

2,567,246

UNITED STATES PATENT OFFICE 2,567,246

CALCULATOR

Athelstan F. Spilhaus, New York, N. Y.

Application February 5, 1946, Serial No. 645,673

9 Claims. (Cl. 33—68)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to calculators and more particularly to means for mechanically measuring various distances in space.

The said invention is well adapted for obtaining a height in space where the base line is known or for determining a base line in space where the height is known, for any relative motion in parallel planes. Although it will be understood that the present invention is not limited thereto, said invention will be illustrated herein by an embodiment which is used for determining differences in altitude between airplanes and clouds.

It is an object of the present invention to provide a means whereby the vertical distance in space between two objects, which are moving relative to each other, may be measured.

It is a further object to provide such a device which is relatively simple and rapid in operation and whereby the desired results may be obtained by relatively simple methematical calculations.

It is still another object to provide a device for measuring distances in space where readings may be taken directly from the device and methematical calculations may be eliminated entirely.

It is still a further object to provide a device whereby the difference in altitude between an airplane, moving along a level course at a known air speed, and a cloud, either above or below it, may be readily and quickly calculated.

These and other objects and advantages of the present invention, which will be better understood as the detailed description thereof progresses, are obtained in the following manner.

If it is desired to measure the vertical distance (which will be referred to hereinafter as "H") between two objects (A and B) located respectively in two spaced horizontal planes, one of which objects is moving in a straight line relative to the other, a calculator embodying the present invention may be positioned at one of said objects (A). Such a calculator includes sighting means adapted to be directed at the second of said objects (B) during such relative movement. The sighting means are swingable about a pivot point located in the plane of the first object (A) and there are provided scale means adapted to measure the length of the swing (which for convenience will be referred to as the "swing distance" or "d") of the sighting means along a straight line, which line is disposed in a horizontal plane located at a known, fixed vertical distance (which will be referred to hereinafter as the "calculator height" or "h") to the said pivot point. If either above or below the second object (B) is sighted for a certain length of time ("T") and the "swing distance" or "d" (as defined above), through which the sighting means are swung during said time, and the distance ("D") the two objects (A and B) move relative to each other during said time are ascertainable, then the vertical distance ("H") between the pivot point (which is in the plane of object A) and the second object (B) may be readily calculated.

More specifically, assume an airplane flying along a straight, horizontal air course at a known constant speed ("S") above a particular cloud. If a calculator embodying the present invention is positioned in the airplane, and, at a certain instant in time, said cloud is sighted through the sighting means of the calculator and said cloud is then tracked by the sighting means for a length of time (T) which is clocked and the "slide distance" (d), through which the sighting means is swung during said time is determined, then the "calculator height" (h) is to the vertical distance (H), between the airplane and the cloud, as the "swing distance" (d) is to the air distance (D) flown by the airplane. As the air distance (D) flown by the airplane may be found from its known true air speed (S) and the clocked time (T), it is readily apparent that the vertical distance (H) between the airplane and cloud may be easily calculated. This will be further discussed below in connection with Figures 3–5 of the annexed drawings.

It will be understood that the same principle may be similarly applied where the airplane is below the cloud, and where it is desired to ascertain the height of an object above a vehicle moving along the ground, etc.

In the accompanying specification there is described, and in the annexed drawings shown, what is considered preferred embodiments of the present invention. It is however to be understood that the present invention is not limited to said embodiments.

In said drawings,

Figure 1 is a perspective view of a cloud height calculator embodying the present invention, the parts being shown in their relative positions during the tracking of a cloud located at a higher altitude than the airplane in which the calculator is positioned;

Figure 2 is an elevational view of the calculator of Figure 1, the parts being shown (in solid lines) at the commencement of a typical tracking operation of a cloud above and to the right of the airplane, and (in broken lines) at the conclusion of said tracking operation;

Figure 3 is a diagrammatic representation of the geometry involved in the operation of the calculator shown in Figures 1–2 when the cloud being tracked is directly below the air course of the airplane;

Figure 4 is similar except that the cloud is directly above the air course of the airplane;

Figure 5 is a similar diagrammatic representation illustrating the situation when the cloud is at a higher altitude than the plane but off to one side;

Figure 6 is a fragmentary elevational view of a modified form of my calculator wherein the shank is of adjustable length.

Referring now to the drawings, the cloud height calculator illustrated in Figures 1–2 includes a T-shaped base member 11 which comprises an elongated horizontally disposed cross member 13 rigidly secured to the upper end of a relatively short vertically disposed shank 15. Secured to one end of said cross member 13 and extending outwardly in both directions is an elongated horizontally disposed stiff straight sighting wire 17 which, as shall be seen, is a sighting reticle. Joined to the other end of said cross member 13 is a suitable bracket 19 by which the calculator may be mounted in an airplane. Rigidly fastened to the lower end of the shank 15 is an elongated horizontally disposed bearing 21, the axis of which is parallel to that of the cross member 13.

An elongated horizontally disposed shaft 23 is positioned in said bearing for longitudinal and rotational movements. The shaft 23 is provided at one end with a fork 25. Swingably sustained by a pair of gudgeons 27 extending inwardly from the two prongs of said fork 25 is a sighting tube 29. The sighting tube 29 shown in the drawings is merely a hollow metal tube, although, if desired, it may be fitted with a suitable lens system (not shown) depending upon the object to be sighted. The other end of the shaft 23 terminates in a stop 31, larger than the diameter of the shaft, to keep the said shaft from being pulled out of the bearing 21 during the use of the instrument. The shaft 23 is provided along its length with a calibrated scale 33.

From the foregoing description, it will be seen that the sighting tube 29 may be manually manipulated so that it will pivot about the axis of the gudgeons 27 and also will pivot about the axis of the shaft 23 and also will be translatable along the longitudinal axis of said shaft 23.

A modified form (Figure 6) of the calculator just described is similar, except that its vertical shank 37 is variable in length, so that the distance between its mutually parallel cross member 39 and shaft 23 may be adjusted. The length of the shank 37 may be made variable in any suitable way. As shown in Figure 6 the cross member 39 is provided with a vertical hole through which the elongated shank 37 extends. The cross member 39 is fitted with a thumb screw 41 to lock the shank 37 at any desired position. The said adjustable shank 37 is provided with a scale 43, preferably calibrated in units of speed, as will be explained hereinafter.

In the operation of the calculator first described (Figures 1–2), let us assume that it is sustained by means of the bracket 19 in an airplane in a position where clouds at a higher altitude are visible through a window or suitable opening. The calculator should be mounted in the plane so that the axis of the shaft 23 is parallel to the plane's line of air flight and so that the sighting wire 17 is parallel to the lateral axis of the plane. In other words, when the airplane is in motion the axes of both the shaft 23 and the sighting wire 17 should be parallel to the surface of the earth immediately below the airplane.

The pilot should be instructed to maintain a constant and level course through the air, at a constant air speed, to maintain the same fore and aft trim and to maintain the plane level laterally during the use of the calculator.

When a reasonably small well defined cloud feature 35 is located for observation, the operator manipulates the sighting tube 29 so as to sight upwardly through the tube 29 at said cloud 35. The tube 29 must be so manipulated that the operator not only sees the cloud 35 through the sighting tube, but also sees the sighting wire 17 at any point along its length. This is accomplished by sliding the shaft 23 longitudinally in its bearing 21 while pivoting said tube 29. Thus, the axis of the sighting tube will intersect both the sighting wire 17 and the cloud 35.

At the instant that the tracking of the said cloud 35 is commenced two other things are done simultaneously. The calibrated scale 33 along the shaft 23 is read (preferably by an assistant operator) and a stop watch is tripped. The reading may be taken at either end of the bearing 21, whichever end is convenient. The cloud 35 is then tracked through the sighting tube 29 for a suitable period of time. During the tracking, the operator must continue to keep not only the cloud 35, but also the sighting wire 17 visible through the sighting tube 29.

At the instant that the tracking of said cloud 35 is completed, two things are done. The watch is stopped and a second reading is made of the scale 33 on the shaft 23 (said reading being taken at the same end of said bearing 21 as the first reading). The difference between the two readings of the scale 33 on the shaft 23 is then computed to ascertain the swing distance ($d$).

It is important for accurate results that, at least at the instant the stop watch is started and at the instant it is stopped, the cloud formation 35 be centered in the sighting tube and the sighting wire 17 appear through the tube as bisecting the circular field of view at its far end. During the balance of the tracking operation it is preferable that the cloud 35 and the sighting wire be not lost from sight through said tube, as it would be difficult to pick them both up again.

It is to be noted that the sighting wire 17 is used merely to properly align the axis of the sighting tube 29 with the center line of said wire 17, which line acts as the pivot about which said sighting tube 29 swings during tracking. Suitable other sighting reference means for this purpose (not shown), such as an optically projected line of light, may be substituted for the said wire 17.

Should it be desired to sight on clouds at a lower altitude than the airplane, this may be done in several ways. The calculator may be used in the position shown in Figures 1 and 2 and sighting accomplished by looking down through the sighting tube 29 and keeping the said tube so positioned that its axis intersects the sighting wire 17. Sighting downward may be easier, however, if the entire calculator is inverted so that the sighting wire 17 is below the sighting tube 29. Such reversal may be facilitated by making the cross member 13 rotatable through 180° relative to the bracket 19.

In the modified form (Figure 6) of my calcucator, wherein the shank 37 is of adjustable length, a preferred embodiment would have said shank calibrated in units of speed (S) and the calibrated scale 33 on the shaft 23 marked off in units of altitude (H). Then the length of the shank 37 may be set for the speed of the airplane at the time that the observations are being made, and the difference in altitude between the airplane and the cloud may be read directly from the calibrated scale 33, as will be explained below.

Diagrammatic representations of what occurs during the tracking of a cloud by the calculator described above are shown in Figures 3-5. Although the airplane moves relative to the cloud, for convenience the said diagrams represent the cloud as moving relative to the airplane. The sighting tube 29 is shown in the two relative positions taken by it at the instant of commencement and the instant of completion of the tracking operation. The axes of said tube 29 in said two positions intersect at a pivot point which represents the axis of the sighting wire 17.

"$h$" represents the "calculator height," as already defined at the beginning of the specification, which is the vertical distance between the axis of the sighting wire 17 and the axis of the shaft 23. "$d$" represents the "swing distance," or the distance along the scale 33 measured during the tracking operation. S represents the true air speed of the airplane and T the time of the tracking operation, as shown by the stop watch. Thus ST indicates the air distance traversed by the airplane during the tracking operation. H represents the difference in altitude between the airplane and the cloud which was tracked.

Figure 3 shows a special case when a cloud 45 is directly below the line of flight of the airplane, and the calculator is used with the wire 17 above the sighting tube 29, as shown in Figures 1 and 2. It will be readily apparent from the diagram of said Figure 3 that two similar triangles are formed, so that we can set up the equation, $$\frac{h}{d}=\frac{H}{ST} \quad (1)$$

or $$H=\frac{hST}{d} \quad (2)$$

As $h, d, S$ and $T$ are known, H may be calculated.

In actual practice, H and ST may be in any units so long as they are the same units and $h$ and $d$ may likewise be in any units so long as said units are the same (but not necessarily the same units as used for H and ST). In the modified device (see Figure 6), where the scale 33 is calibrated so that the difference in altitude (H) between the airplane and the cloud may be read directly from said scale, ST is taken as a fixed distance as, for instance, 10,000 feet. Then the scale 33 may be marked in feet of altitude (H) directly instead of units of swing distance ($d$).

In using the calculator of Figure 6, as so calibrated, the plane must be operated at some predetermined speed (S) so that tracking for some predetermined period of time (T) gives the desired predetermined base line (ST) as, for instance, the 10,000 feet suggested above. Thus, it is seen that in the Formula 2 above, ST is kept constant, viz. 10,000 feet.

If for one reason or another the predetermined distance cannot conveniently be run by the airplane during a particular tracking operation, then a suitable correction has to be made for the value of H as read from the scale 33. Thus, if during the tracking operation the plane only covers 8,000 feet instead of 10,000 feet, the H reading taken from the scale 33 is multiplied by $5/4$ to ascertain the correct value of H.

In the modified form (Figure 6) of my invention, having a shank 37 of variable length, the $hS$ of Formula 2 above is maintained at a constant by varying $h$ according to the speed of the plane (S) at the time. This is accomplished by adjusting the length of said shank 37.

If the calculator described is used to measure the vertical distance to a cloud positioned at a lower altitude than that of the airplane, the calculator is positioned above a window or opening through which suitable visibility is obtained for tracking in a downward direction.

Figure 4 is a diagrammatic representation of the special situation when a cloud 47 being tracked is directly above the line of flight of the airplane. It will be noted that again there are two similar triangles. The only difference between Figures 3 and 4 is that in one the smaller triangle is inside, and in the other outside, of the larger triangle. The equation set forth above and its solution still hold however for this case.

Figure 5 is a diagram of the more general situation (of which Figure 4 is a special case) where a cloud 49 sighted is above, but to one side of, the airplane's course. It is readily seen that there are produced two similar pyramids, the bases of which are in parallel, vertically disposed planes. Thus again the same equation and the solution given above may be applied. It will be noted that, in a case where the cloud is below and to one side of the airplane, the diagram and solution will be similar to that of Figure 5, except that the smaller pyramid will be inside, rather than outside, of the larger pyramid.

It will be clear that the principle of the invention described above may be used in many ways other than for determining cloud heights. One such application would be to determine the height of a plane above the ground by using the present calculator either from the plane or from the ground. In such use the ground speed would have to be substituted for air speed as S in the equations above.

While there has been described what is at present considered a preferred embodiment of the invention, it will be obvious to those skilled in the art that various modifications and changes may be made therein without departing from the invention and it is therefore aimed in the appended claims to cover all such changes and modifications as fall within the true spirit and scope of the invention.

What is claimed is:

1. In a calculator, a linear sighting reticle, sighting means having a sighting axis which may intersect said sighting reticle at all operable positions and which sighting axis is both translatable along and swingable about a slide axis disposed perpendicular to said reticle and in a spaced parallel plane and which sighting axis is also swingable about a second axis perpendicularly intersecting said slide axis, and scale means to indicate the distance of translation of said sighting axis along said slide axis.

2. In a calculator, a support, a longitudinally and rotationally movable shaft sustained by said support, scale means to indicate the longitudinal position of said shaft relative to said support, sighting means pivotably sustained by said shaft for substantially universal movement relative to said shaft, and a linear sighting reticle, said shaft and sighting reticle being disposed perpendicular to each other and in spaced parallel planes.

3. In a calculator for making measurements relative to distant objects, a base member, a shaft sustained by said base member and movable longitudinally along and rotationally about its axis, sighting means pivotably sustained by said shaft, a linear sighting reticle sustained by said base member at right angles to the shaft and in a plane spaced from and parallel to said shaft, the sighting means being adapted to be moved so that its axis simultaneously intersects both the sighting reticle and a distant object, and means to indicate the longitudinal position of the shaft.

4. In a calculator, a base member, a linear sighting reticle sustained by said base member, a shaft sustained by said base member which is slidable longitudinally along and rotatable about its axis, said reticle and axis being mutually perpendicular and positioned in spaced parallel planes and universally movable sighting means sustained by said shaft.

5. In a calculator as defined in claim 4, means to vary the spacing between said planes.

6. In a calculator as defined in claim 4, means to vary the distance between said planes, scale means to indicate the longitudinal position of said shaft, and second scale means to indicate the spacing between said planes.

7. In a calculator as defined in claim 4, means to vary the distance between said planes, scale means calibrated in distance units to indicate the longitudinal position of said shaft, and second scale means calibrated in speed units to indicate the spacing between said planes.

8. In a calculator, a base member, a linear sighting reticle sustained by said base member, a shaft sustained by said base member for longitudinal and rotational movements, said shaft and reticle being normal to each other and in parallel planes spaced a predetermined distance apart, sighting means sustained by said shaft and swingable about the sighting reticle, and means supported by said shaft to indicate the distance of longitudinal movements of said shaft.

9. In a calculator, a base member, a linear sighting reticle sustained by said base member, a shaft sustained by said base member for longitudinal and rotational movements, said shaft and reticle being normal to each other but in spaced parallel planes, means to vary said spacing between said shaft and reticle, sighting means sustained by said shaft and swingable about the sighting reticle, and means to determine the distance of longitudinal movement of said shaft.

ATHELSTAN F. SPILHAUS.

REFERENCES CITED

The following references are of record in the file of this patent:

UNITED STATES PATENTS

| Number | Name | Date |
|---|---|---|
| 313,494 | Hale | Mar. 10, 1885 |
| 1,345,289 | Tucker | June 29, 1920 |

FOREIGN PATENTS

| Number | Country | Date |
|---|---|---|
| 16,273 | Great Britain | July 11, 1912 |
| 88,234 | Germany | Sept. 12, 1896 |
| 41,911 | Norway | Sept. 21, 1925 |